United States Patent
Novoselov et al.

(10) Patent No.: US 8,784,617 B2
(45) Date of Patent: Jul. 22, 2014

(54) PROCESS OF CONVERTING GASEOUS HYDROCARBONS TO A LIQUID HYDROCARBON COMPOSITION

(75) Inventors: Yury N. Novoselov, Moscow (RU); Alexey I. Suslov, Tomsk (RU); Oleg P. Kutenkov, Tomsk (RU)

(73) Assignee: EVOEnergy, LLC, Woodinville, WA (US)

( * ) Notice: Subject to any disclaimer, the term of this patent is extended or adjusted under 35 U.S.C. 154(b) by 655 days.

(21) Appl. No.: 13/015,321

(22) Filed: Jan. 27, 2011

(65) Prior Publication Data

US 2011/0190565 A1 Aug. 4, 2011

Related U.S. Application Data

(63) Continuation of application No. PCT/RU2010/000032, filed on Jan. 29, 2010.

(51) Int. Cl.
*B29C 59/10* (2006.01)

(52) U.S. Cl.
USPC ............ 204/168; 422/186.04; 422/186.23; 422/186.21; 204/169; 204/170; 204/178; 252/372; 252/373; 585/953; 423/210; 423/246

(58) Field of Classification Search
CPC ............ B01J 19/088; B01J 2219/0813; B01J 2219/0828; B01J 2219/083
USPC ............ 204/168, 169, 170, 178; 422/186.04, 422/186.23, 186.21; 252/372, 373; 585/953; 423/210, 246
See application file for complete search history.

(56) References Cited

U.S. PATENT DOCUMENTS

| | | | |
|---|---|---|---|
| 6,375,832 B1 | 4/2002 | Eliasson et al. | |
| 7,033,551 B2 * | 4/2006 | Kong et al. | 422/186.04 |
| 2003/0136661 A1 | 7/2003 | Kong et al. | |
| 2003/0141182 A1 | 7/2003 | Kong et al. | |
| 2006/0156620 A1 | 7/2006 | Clayton et al. | |
| 2006/0163113 A1 * | 7/2006 | Clayton et al. | 208/15 |
| 2008/0289494 A1 | 11/2008 | Boutot et al. | |
| 2009/0038933 A1 | 2/2009 | Boutot et al. | |
| 2009/0056222 A1 | 3/2009 | Gutsol et al. | |
| 2009/0196804 A1 | 8/2009 | Masuda et al. | |
| 2010/0041776 A1 * | 2/2010 | Czernichowski et al. | 518/700 |

FOREIGN PATENT DOCUMENTS

| | | |
|---|---|---|
| CA | 2621749 A1 | 8/2009 |
| RU | 2088565 | 8/1997 |
| RU | 2249609 | 4/2005 |

OTHER PUBLICATIONS

International Search Report and Written Opinion issued in PCT/RU2010/000032 and mailed Nov. 2, 2010.
First Office Action received in Russian Patent Application No. 2012131662 issued Jan. 1, 2014 (7 pages)—with English translation.

(Continued)

*Primary Examiner* — Xiuyu Tai
(74) *Attorney, Agent, or Firm* — Foley & Lardner LLP

(57) ABSTRACT

A non-thermal, repetitively-pulsed gliding discharge reactor includes a high-voltage power source configured to provide a pulsed high-voltage potential; a gas inlet; a liquid sorbent inlet; a product outlet; a plurality of first electrodes connected to the high-voltage power source; a plurality of second electrodes that are grounded; and a trough; the plurality of first electrodes being separated from the plurality of second electrodes by a discharge region.

26 Claims, 5 Drawing Sheets

(56) References Cited

OTHER PUBLICATIONS

Office Action received in Japanese Patent Application No. 2012-551115 mailed Jan. 6, 2014 (5 pages)—with English translation.

Written Opinion and Search Report issued in Singapore Application No. 201205475-5 issued Nov. 14, 2013 (17 pages).

First Office Action received in Chinese Application No. 201080065879.8 issued Jan. 10, 2014 (2 pages)—English Translation Only.

* cited by examiner

PROCESS OF CONVERTING GASEOUS HYDROCARBONS TO A LIQUID HYDROCARBON COMPOSITION

CROSS-REFERENCE TO RELATED APPLICATIONS

This application is a continuation application of International Application No. PCT/RU2010/000032 filed on Jan. 29, 2010, the entire contents of which is hereby incorporated by reference.

TECHNOLOGY

This technology is generally related to fuel production. More specifically, it is related to the transformation of a hydrocarbon gas to a liquid hydrocarbon.

BACKGROUND

It is currently estimated that there are between 3 and 12 billion dollars a year of natural gas lost to flare off due to an inability to capture, refine, and/or transport it effectively. While methods are known for capture, refinement and/or transport of natural gases, they tend to be cumbersome and not readily amenable to use in remote or offshore natural gas deposit locations.

Natural gases may be converted to liquid fuels by a variety of known methods. For example, such methods include Fischer-Tropsch and Mobil Processes, as well as plasma-assisted gas-to-liquid (GTL) techniques. The Fischer-Tropsch and Mobil Processes involve multi-stage synthetic steps where a light hydrocarbon (i.e. hydrocarbon gas) is initially transformed to syngas, under high pressure and high temperatures of up to 1300 K. Syngas is a mixture of carbon monoxide (CO) and hydrogen ($H_2$). It is typically formed by oxygen-deprived combustion of the hydrocarbon gas. The following reactions are exemplary of these well-known processes:

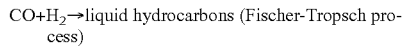

CO+$H_2$→liquid hydrocarbons (Fischer-Tropsch process)

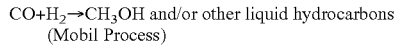

CO+$H_2$→$CH_3OH$ and/or other liquid hydrocarbons (Mobil Process)

Because of the extreme thermal operating conditions, syngas reformers are massive to build and are expensive to operate. GTL plants, in order to be commercially viable, need to be very large and complex. High operating energy consumption is required for gas compression and heating, and accounts for approximately 60-80% of all costs for fuel production by such methods. Furthermore, generally expensive reformation catalysts are used in all stages of the conventional processes, and require catalyst recovery from the systems.

Another approach to the conversion of light hydrocarbons to liquid fuels is via a non-thermal plasma-assisted method. U.S. Pat. No. 7,033,551 (the '551 Patent) discloses a reactor system having an electrochemical cell and a dielectric barrier discharge, where the formation of liquid products occurs primarily through the oligomerization of gaseous hydrocarbon radicals in a non-thermal plasma of a barrier gas discharge. Non-thermal plasmas provide an initial radical concentration via dissociation of light alkane molecules by energetic electrons at low gas temperature (about 100° C. to about 600° C.) under atmospheric gas pressure. Electrochemical cells in conjunction with the barrier discharge allows for oxidation of excess hydrogen in the plasma, partial oxidation, and oxidative condensation of the primary gas. The final composition includes a mixture of liquid hydrocarbons, of which a minority are alcohols.

The method described in U.S. Pat. No. 7,033,551 is based on the implementation of dissociation processes that occur under the action of "hot" electrons on hydrocarbon molecules inside the barrier discharge reactor according to reaction (1):

$e^- + RH \rightarrow R\cdot + H\cdot + e^-$ (1)

In reaction (1), RH is a general formula for a hydrocarbon and $e^-$ is an electron. The radicals R· and H· are formed at high activation energies (>400 kJ/mol) in such processes. Similar processes with a similarly high activation energy may also be facilitated through a light-assisted process, where an ultraviolet (UV) radiation source (hv) provides the requisite energy, as described by the '551 Patent:

$hv + RH \rightarrow R\cdot + H\cdot$ (2)

The large activation energy requirement for reactions (1) and (2) is due to energy state of the unactivated hydrocarbon molecule lying at a level that is much lower than the energy state of its dissociated components. Each bond breaking event (i.e. dissociation) through electron impact takes place only via electronic state excitation, and in doing so consumes a significant amount of energy. Taking into account the energy released on reformation of higher hydrocarbons (reaction (3)) after the dissociation reactions above:

$2R\cdot \rightarrow R_2$ (3)

the energy consumption for the process typically is higher than 100 kW*h per 1 kg of the end product.

U.S. Pat. No. 6,375,832 (the '832 Patent) discloses the synthesis of liquid products under the action of a barrier discharge, while the use of a catalyst is optional. In the synthetic process described by the '832 Patent, oligomers of hydrocarbon radicals are produced as a result of dissociation of the feed gas, and reformation of hydrocarbons from free radical fragments through direct coupling and oxidative condensation:

$CH_4 \rightarrow C_2H_6 \rightarrow C_4H_{10}$ (4)

If $CO_2$ is introduced into the feeding gas mix as an oxidant, then carbon dioxide conversion also occurs and contributes to the formation of the liquid hydrocarbons. Alcohols may also be produced as a result of $CO_2$ decomposition. Such processes are summarized by reactions 5-7:

$CO_2 + e^- \rightarrow CO + O\cdot + e^-$ (5)

$RH + O\cdot \rightarrow R\cdot + OH$ (6)

$R\cdot + OH \rightarrow ROH$ (7)

Limiting factors of the above plasma-assisted methods are: the non-chain character of conversion processes in the barrier discharge reactor and the high activation energy (>400 kJ/mol) of the primary radical formation process. Consequently, the specific energy consumption for the production of liquid products commonly exceeds 100 kW*h per 1 kg of product. Another significant limitation of the barrier discharge plasma-assisted methods is the low current ($10^{-5}$-$10^{-3}$ A/cm$^2$) and power density of the barrier discharge plasma (1-10 W/cm$^3$), which reduces the capability of the reactor systems. Furthermore, the above plasma-assisted methods control only the feed gas temperature.

SUMMARY

In one aspect, a process is provided including introducing a gaseous hydrocarbon into a reactor including a plurality of first electrodes individually connected to a pulsed, high-voltage power source, a plurality of second electrodes that are grounded, and a trough, where the plurality of first electrodes is separated from the plurality of second electrodes by a discharge region; introducing to the trough a liquid sorbent; generating a non-thermal, repetitively pulsed gliding discharge in the discharge region; and producing a liquid hydrocarbon composition. According to one embodiment, a level of the liquid sorbent in the reactor is maintained in close proximity to the discharge region. In some embodiments, each of the plurality first electrodes are connected to the pulsed, high-voltage power source via a capacitor. In some embodiments, a duration of a single pulse of the non-thermal, repetitively-pulsed gas discharge reactor is less than 100 ns. In some embodiments, an electric field strength inside the a non-thermal, repetitively-pulsed gas discharge reactor is less than 8 kV/cm. In some embodiments, a specific energy of the plasma is from about 0.2 J/cm$^3$ to about 2.5 J/cm$^3$.

In some embodiments, the gaseous hydrocarbon is a $C_1$, $C_2$, $C_3$, or $C_4$ alkane. In some such embodiments, the gaseous hydrocarbon is methane, ethane, n-propane, iso-propane, n-butane, iso-butane, tent-butane, or a mixture of any two or more such gases.

In some embodiments, the gaseous hydrocarbon also includes $CO_2$, air, or oxygen. In some embodiments, the gaseous hydrocarbon also includes $CO_2$.

In some embodiments, the reactor also includes a solid catalyst. In some such embodiments, the solid catalyst includes alumina, alumosilica, an aluminophosphate, Li, Na, K, Be, Mg, Ca, Sr, Ba, Cu, Ag, Au, Zn, Cd, Hg, Fe, Ru, Os, Co, Rh, Ir, Ni, Pd, Pt, or a mixture of any two or more such materials.

In some embodiments, the liquid sorbent is gasoline, diesel fuel, kerosene, a liquid alkane, or a mixture of any two or more such materials.

In some embodiments, a time to develop a charge prior to each discharge is from about 10 µs to 100 µs, from about 10 µs to 80 µs, from about 20 µs to 50 µs, or is about 35 µs. In some embodiments, a time of a single discharge is on the order of about 10 ns.

In some embodiments, the liquid hydrocarbon composition includes saturated hydrocarbons and a specific energy of the non-thermal, repetitively-pulsed gas discharge is about 0.5 J/cm$^3$ to about 2 J/cm$^3$ per pulse. In some embodiments, the liquid hydrocarbon composition includes olefins and the specific energy of the non-thermal, repetitively-pulsed gas discharge is about 2 J/cm$^3$ per pulse. In some such embodiments, the reactor includes a solid catalyst including a zeolite, a oxide of an element of Groups IIB, IVB, VB, or VIB groups, an element of Group VIIIB, or a mixture of any two or more such materials.

In some embodiments, the liquid hydrocarbon composition includes hydrocarbon oils, and the specific energy of gas discharge is from about 2 J/cm$^3$ to about 2.5 J/cm$^3$ per one discharge pulse. In some such embodiments, the reactor includes a solid catalyst including a cation, a metal oxide, a complex of an element of Groups IIA, IIIA, IVB, VB, or VIIIB, or a mixture of any two or more such materials.

In some embodiments, the gaseous hydrocarbon also includes $O_2$, and the $O_2$ concentration is lower, than a flame ignition limit.

In some embodiments, the reactor includes a solid catalyst including oxides of elements IIA, IVA, IIB, IVB groups and elements of VIIIB group.

In another aspect, a device is provided that is a non-thermal, repetitively-pulsed gliding discharge reactor including a high-voltage power source that is configured to provide a pulsed high-voltage potential; a gas inlet; a liquid sorbent inlet; a product outlet; a plurality of first electrodes individually connected to the pulsed, high-voltage power source; a plurality of second electrodes that are grounded; and a trough; where the plurality of first electrodes is separated from the plurality of second electrodes by a discharge region. In some embodiments, each of the plurality first electrodes are connected to the pulsed, high-voltage power source via a capacitor.

In some embodiments, the trough includes a solid catalyst. In some such embodiments, the solid catalyst includes alumina; alumosilica; an aluminophosphate; a zeolite; a metal oxide; a cation; an oxide of an element of Groups IIB, IVB, VB, or VIB groups; an element of Group VIIIB; a complex of an element of Groups IIA, IIIA, IVB, VB, or VIIIB, or a mixture of any two or more such materials.

In some embodiments, the high voltage pulse generator is configured to deliver a single pulse that is less than 100 ns. In some embodiments, the reactor is configured to have an electric field strength inside the non-thermal, repetitively-pulsed gas discharge reactor of less than 8 kV/cm. In some embodiments, the reactor is configured to provide a discharge having a specific energy of from about from about 0.1 to about 5 J/cm$^3$.

In some embodiments, the plurality of first electrodes and the plurality of second electrodes are mounted to a reactor body. In some embodiments, the plurality of first electrodes and the plurality of second electrodes are arranged annularly mounted to a reactor body.

In some embodiments, the trough is formed in the reactor body in a ring or an polygonal configuration. In some embodiments, the trough includes polytetrafluoroethylene. In some embodiments, the reactor body also includes one or more radial channels connecting the trough to a central region of the reactor body.

In some embodiments, the reactor also includes a liquid sorbent reservoir. In some embodiments, the reactor also includes a receiver.

In some embodiments, the first and second electrodes include iron, chromium, nickel, gold, silver, copper, platinum, yttrium, iridium, palladium, rhenium, ruthenium, molybdenum, tungsten, titanium, vanadium, alloys thereof, oxides thereof, graphite, or a mixture of any two or more such materials.

DETAILED DESCRIPTION

Figure 1:
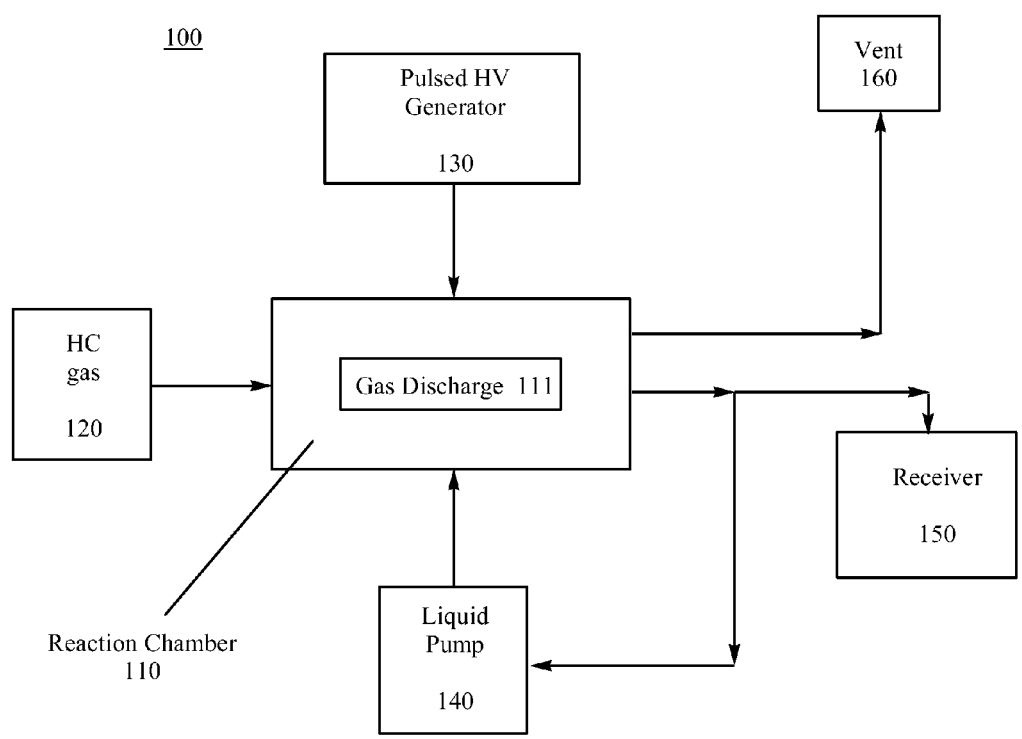
FIG. 1 is a flowchart diagram of a plasma reactor gas to liquid transformer system and process, according to various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The present technology is also illustrated by the examples herein, which should not be construed as limiting in any way.

Provided herein is a device and process for preparing liquid fuels from natural gases using a non-thermal pulsed gliding electrical discharge. The liquid fuels are formed from the natural gases using vibrational and rotational excitation of the gas molecules, as set forth for example in reactions 8-10:

$$e^- + RH \rightarrow RH^* + e^-  \quad (8)$$

$$RH^* + H \cdot \rightarrow (R \cdot)^* + H_2 \quad (9)$$

$$(R \cdot)^* + RH^* \rightarrow R_2 + H \cdot \quad (10)$$

Stimulation of the gases to vibrationally- and rotationally-excited levels, requires much lower activation energy than that for the dissociation of the gases as set forth in reactions 1-3 and 5-7. As used herein, $e^-$ is an electron; RH is a hydrocarbon fragment; "·" indicates a free-radical species; and "*" indicates a vibrationally or rotationally excited state. It will be recognized that in the initiation of the reactions, RH refers to a $C_1$-$C_4$ hydrocarbon fragment from the natural gas, or initially formed, small $R_2$ compounds, however, as the chain begins to build, RH may also refer to successively larger hydrocarbon fragments that remain within the plasma and therefore continue to be rotationally and vibrationally excited, forming yet larger hydrocarbon fragments. Chain termination reaction 11 and hydrogen recovery reaction 12 are additional reactions in the overall scheme of hydrocarbon fuel formation:

$$(R \cdot)^* + RH^* \rightarrow R_2 + H \cdot \quad (11)$$

$$2H \cdot \rightarrow H_2 \quad (12)$$

In some embodiments, the process may also include a dissociation reaction such as that illustrated by reaction 1, where the energy of the system varies to a level in which dissociation reactions may occur. However, such dissociation reactions provide only a minor contribution to the overall reaction sequence.

The process illustrated by reactions 8-11 is a chain reaction mechanism that results in the formation of $R_2$. Such a chain reaction mechanism differs from the short-path dissociation-reformation mechanisms illustrated by reactions 1 and 3 in the barrier discharge plasmas. Moreover, reactions 8-11 occur at lower activation energy than the dissociative process of the barrier gas discharge processes. The activation energy required by the chain reaction mechanism embodied herein is lower than the barrier gas discharge process by several times, or even by several orders of magnitude, depending on the particular reacting species. The chain reaction mechanisms also provide for a constant amount of free radicals in the plasma for the entire period of the gas discharge action.

The parameters required by the devices to generate the non-thermal pulsed gliding discharge described herein, differ significantly from the parameters required for barrier discharge systems previously described. For example, the electric field strength required in the non-thermal pulsed gliding discharge is approximately 26% that of a barrier discharge, yet the energy deposited into one discharge channel is about 3,300% higher. Thus, the present non-thermal pulsed discharge provides for a greater capability than the barrier discharge systems. Table 1 lists several examples of such parameters.

TABLE 1

Comparison of plasma parameter examples for barrier discharge and non-thermal pulsed discharge conditions.

| Parameter | Barrier discharge | Non-thermal pulsed discharge |
|---|---|---|
| Electric field strengh | 30 kV/cm | 8 kV/cm |
| Pulse duration | $10^{-8}$ s | $10^{-7}$ s |
| Current | 0.1 A | 1.25 A |
| Energy deposition in one discharge channel | $3.0 \times 10^{-5}$ J | $10^{-3}$ J |

Thus, in one aspect, the present technology is directed to a device and a method for the conversion of normally gaseous hydrocarbons to normally liquid hydrocarbons using a non-thermal, repetitively pulsed gliding discharge. The device includes a reaction chamber having a plurality of first electrodes, which are connected to a high voltage pulsed power supply, and a plurality of second electrodes, which are grounded. The first electrodes and the second electrodes are separated by a discharge region, or gap. The first and second electrodes are arranged in pairs, such that for each first electrode a second electrode is located on the opposite side of the discharge region. In some embodiments, the first and second electrodes are pin electrodes.

The discharge region is located in close proximity to a trough which contains at least a liquid sorbent. When a high-voltage potential is applied to the first electrode, a discharge results within the discharge region. The discharge then propagates from the first electrode to its paired second electrode. The propagation of the discharge is along the surface of the liquid sorbent, or within close proximity of the surface of the liquid of the liquid sorbent. Because the discharge is said to propagate from the first electrode to the second electrode in a sliding, or gliding, fashion along the surface of the liquid sorbent, such a discharge is herein termed, "a gliding discharge." To maintain the discharges, the high-voltage potential is pulsed, with each pulse responsible for a discharge. The discharges that are initiated and maintained by the device are non-thermal. As such, the device produces, a non-thermal, repetitively pulsed gliding discharge.

The plasma that is generated in the operation of the device is a non-thermal plasma. As used herein, the term "non-thermal plasma," or "cold plasma," are plasmas that are not in a state of thermodynamic equilibrium. While the electrons in non-thermal plasmas have high electron temperatures, the temperature of the other atoms and molecules in the plasma are relatively low, hence the system is not in thermodynamic equilibrium.

In comparison to a non-thermal plasma, thermal plasmas, or "hot plasmas," are produced as a result of strong gas heating in a gas discharge to the temperature of several thousand Kelvin, and, as a result, the energy distribution of the gas molecules, ions and electrons in the thermal plasma, and the system, is in thermodynamic equilibrium accompanied by pyrolysis. The resulting large number of collisions between particles, in particular, between electrons and heavy positive ions or neutral particles, leads to rapid redistribution of energy so that thermodynamic equilibrium is reached. Thus, the temperature in the discharge region is uniformly very high for all particles.

In addition to the electrodes and trough, the reaction chamber also includes a gas inlet for the introduction of gaseous hydrocarbons to the chamber in which the discharge occurs; a liquid sorbent inlet and outlet through which the liquid sorbent may be circulated in the trough; a product outlet; and a vent through which gases may be vented from the chamber. The reaction chamber geometry and design is not particularly limited and may be, but is not limited to, an annular (i.e. circular) arrangement, polygonal (i.e. triangular, square or rectangular, pentagonal, hexagonal, etc.) arrangement, a linear arrangement, or other arrangement as may be designed.

In various embodiments, the device may also include a gas source that is in communication with the reaction chamber and a meter for determination of flow of the gas to the chamber. The device may also include a fluid pump for circulation of the liquid sorbent. The device may also include a collection, or product reservoir. The device may also include devices for capturing, or scrubbing, vent gases from the reaction chamber.

As used herein, the term "gaseous hydrocarbons," or feedgas hydrocarbons, are those light hydrocarbon materials that exist in the gaseous state at standard temperature and pressure. The light hydrocarbon materials are typically low order hydrocarbons having from one to four carbon atoms. For example, such light hydrocarbon materials may include, but are not limited to, methane, ethane, propane, n-butane, iso-butane, and tent-butane, or a mixture of any two or more such compounds. In some embodiments, the light hydrocarbons may be those that are associated with natural gas or oil production, or are produced as a result of land-fill operations, or other natural gas deposits or generation.

Without being bound by theory, it is believed that when such materials enter the reaction chamber and are subjected to a non-thermal gliding discharge, the molecules of the gaseous hydrocarbon are excited both rotationally and vibrationally, but at an energy level that is not sufficient to immediately rupture the bonds of the molecule into ionic or free-radical states. Instead, the vibrationally and rotationally excited molecules interact with one another to form higher hydrocarbons via mechanisms such as those set forth in reactions 8-11 and 12. The higher hydrocarbons thus formed, have from five to 20 carbon atoms.

Again, without being bound by theory, it is believed that the described non-thermal, repetitively pulsed gliding discharge provides for a step-wise, chain formation mechanism from low order to higher order hydrocarbon products as illustrated by reactions 8-11, above, and 8'-11', below.

$$HRH + e^- \rightarrow HRH^* + e^- \quad (8')$$

$$HRH^* + HRH^* \rightarrow HR\text{—}RH + H_2 \quad (9')$$

$$HR\text{—}RH + e^- \rightarrow [HR\text{—}RH]^* + e^- \quad (10')$$

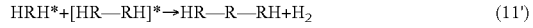

$$HRH^* + [HR\text{—}RH]^* \rightarrow HR\text{—}R\text{—}RH + H_2 \quad (11')$$

Thus, hydrocarbons, HRH and HR—RH, are excited both vibrationally and rotationally by the electrons of the gliding plasma, reactions (8') and (10'). These excited hydrocarbons may then interact with other excited hydrocarbons thereby forming higher order hydrocarbons, reactions (3) and (5). The energy of the gliding plasma is adjusted such that immediate and complete ionization, or free-radical formation from the gaseous hydrocarbons upon contact with the plasma is avoided, or at least minimized. When the higher order hydrocarbons, illustrated as HR—RH and HR—R—RH, reach sufficient size, they fall, or condense, from the plasma as a liquid hydrocarbon product and are collected in, and removed from, the reaction chamber by the liquid sorbent. In the reactions above, R is intended to refer to any hydrocarbon fragment of any size and is only used herein to generally describe the chain formation mechanism from lower order hydrocarbons to higher order hydrocarbons.

The liquid sorbent that is circulated through the reaction chamber performs several functions including, but not limited to, assisting in propagation of the non-thermal gliding plasma, collection of the liquid hydrocarbon products, and cooling of the system. Suitable liquid sorbents include, but are not limited to, gasoline, diesel fuel, kerosene, light oil, liquid alkanes, or a mixture of any two or more such liquids. During operation of the hydrocarbon gas conversion system, the liquid sorbent is maintained in close proximity to the non-thermal, repetitively-pulsed plasma thus facilitating the absorption of liquid hydrocarbons produced in the plasma. Such an arrangement provides for facile removal (e.g. within about $10^{-5}$ sec of formation) of the liquid hydrocarbon products after the discharge pulse. This facile removal also acts to moderate the temperatures in the reaction chamber preventing loss of product and sorbent due to heating.

Non-thermal gliding plasma formation of hydrocarbons, stands in stark contrast to other non-thermal plasma mechanisms. For example, other non-thermal plasmas such as barrier-, corona-, microwave-, and arc-discharge plasmas rely upon direct ionization and free-radical species formation from a hydrocarbon gas. The ionized or free-radical species are then re-formed into higher order hydrocarbon products.

Thus, in some embodiments, the plasma generated in the gap between the first electrode(s) and the second electrode(s) is not generated in a dielectric barrier discharge. Further, in some embodiments, there is no dielectric oxide material, such as quartz; or materials such as zirconia, alumina, glass, and the like, in the region between the first and second electrodes. Hence the plasma generated by the present technology is not based upon a dielectric barrier discharge. Furthermore, the non-thermal gliding plasma provides a mechanism through which reactor efficiency may be enhanced due to the ability to use gas mixtures having a higher power density than conventional syngas or $CO_2$ feedstocks.

The liquid hydrocarbon products may include a wide variety of fuel products or commodity chemicals. For example, higher order, $C_5$ to $C_{20}$, or higher, hydrocarbons may be prepared. Such, hydrocarbons include, but are not limited to the $C_5$ to $C_{20}$ alkanes, alkenes, alkynes, their isomeric forms, and mixtures of any two or more such compounds. Mixtures of the hydrocarbons may further include such products are as are found in gasoline, diesel, kerosene fuels, hydrocarbon waxes, and hydrocarbon oils. Further, oxygenated or nitrogenated materials may be introduced with the gaseous hydrocarbon feedstock to introduce oxygen and/or nitrogen into the product liquid hydrocarbons. Such oxygen or nitrogen containing hydrocarbons may include, but are not limited to compounds such as alcohols, aldehydes, esters, amines, carboxylic acids, and ketones.

In some embodiments, gaseous oxidants may be introduced with the hydrocarbon gas into the plasma. Such gaseous oxidants provide oxygen atoms and radicals that may be incorporated into the products of the hydrocarbon gas conversion. Suitable gaseous oxidants for use in the process may include, but are not limited to air, $O_2$, $H_2O$, $N_2O$ and $CO_2$ or a mixture of any two or more such oxidants. The products of the hydrocarbon conversion include oxygenated hydrocarbons such as, but not limited to alcohols, aldehydes, ketones, esters, or mixtures of any two or more thereof such oxygenated hydrocarbons. Solid catalysts may optionally be used within the reaction chamber to enhance the selectivity and efficiency of production of the oxygenated hydrocarbons.

According to some embodiments, the specific energy of the non-thermal, repetitively pulsed gliding discharge provides precise control of the vibrational temperature, $T_v$. Such control, in part, allows for selection of the product distribution. As noted above, non-thermal plasmas are relatively cold and their temperature per se is not regulated. For example, the temperature of non-thermal plasmas are typically less than 1000K. However, the vibrational temperature, $T_v$, of the gas may be controlled through the control of the specific energy of the non-thermal gliding discharge and may be adjusted to between 1,300K and 10,000K. Through control of the $T_v$, the activation energy is adjustable and the desired reaction pathway can be controlled. However, as is typical for non-thermal plasmas, the electron temperature, $T_e$, is high. For example, in some embodiments, $T_e$ is greater than 10,000K. Thus, the desired $T_v$ may be selected by appropriate control of the specific energy of the plasma to about 0.1 to about 3 $J/cm^3$. In various embodiments, the appropriate specific energy of the non-thermal plasmas of repetitively pulsed spark discharge is from about 0.2 to about 2.5 $J/cm^3$, from about 0.2 to about 0.5 $J/cm^3$, from about 0.75 to about 1.25 $J/cm^3$, from about 1.5 to about 2.0 $J/cm^3$, from about 2.0 to about 2.5. According to some embodiments, the minimum energy of the non-thermal, repetitively pulsed plasma is about 0.2 $J/cm^3$. According to some embodiments, the maximum energy of the non-thermal, repetitively pulsed plasma is about 2.5 $J/cm^3$.

During operation of the hydrocarbon gas conversion system, the energy between pulses of the non-thermal, repetitively pulsed plasma may be fluctuated to provide for a change in the liquid hydrocarbon product stream. For example, a gradual increase of the energy by two or three times over multiple pulses allows for a transition from saturated hydrocarbon production to olefins and hydrocarbon oil production. Without being bound by theory, it has been found that the electric field strength between the electrodes is one factor in controlling the efficient transmission of the energy from the non-thermal, repetitively pulsed plasma to the feedgas hydrocarbons. Thus, in some embodiments, the electric field strength between the electrodes is less than 10 kV/cm. In other embodiments, the electric field strength between the electrodes is less than 8 kV/cm. In other embodiments, the electric field strength between the electrodes is from about 5 kV/cm to about 10 kV/cm. In yet other embodiments, the electric field strength between the electrodes is from about 5 kV/cm to about 8 kV/cm.

The specific energy of the non-thermal plasma generation may also impact the types of liquid hydrocarbons that are produced by the non-thermal, repetitively pulsed gliding discharge. For example, the specific energy of the system may be varied to produce saturated hydrocarbons, olefins, hydrocarbon oils, or oxygenated hydrocarbons. For the production of saturated hydrocarbons, a specific energy of the non-thermal plasma is from about 0.75 $J/cm^3$ to about 1.25 $J/cm^3$. For the production of olefins, a specific energy of the non-thermal plasma is from about 1.5 $J/cm^3$ to about 2.0 $J/cm^3$. In some embodiments for olefin production, the specific energy of the non-thermal plasma is about 2 $J/cm^3$. For the production of hydrocarbon oils, a specific energy of the non-thermal plasma is greater than about 2 $J/cm^3$. For example, for hydrocarbon oil production, the specific energy of the non-thermal plasma is from about from about 2.0 $J/cm^3$ to about 2.5 $J/cm^3$. For the production of oxygenated hydrocarbons, a specific energy of the non-thermal plasma is from about 0.1 to about 0.5 $J/cm^3$.

The present process provides for comparatively low, overall energy consumption. In some embodiments, the overall energy consumption is less than about 1 kWh/kg. In some embodiments, the overall energy consumption is about 1 kWh/kg. In some embodiments, the overall energy consumption is from about 0.5 to about 1.5 kWh/kg. Hence, the activation energy of reaction paths (2)-(5) are sufficiently lower, than in barrier discharge processes.

During operation of the hydrocarbon gas conversion system, the duration of the current pulse also plays a role in product formation. Thus, in some embodiments, the duration of the current pulse is less than 100 nanoseconds (ns). In other embodiments, the current pulse is from about 50 ns to about 100 ns. The timing of the current pulse and the duration of the pulse thus provides a repetition rate for the pulse. According to some embodiments, the repetition rate may reach a maximum of about 10 kHz. While there is no lower limit on the repetition rate, in some embodiments, the repetition rate is from about 0.5 kHz to about 10 kHz.

The present process provides for high conversion (i.e. yield) of light hydrocarbons in the reactor. According to some embodiments, the conversion, based upon the feedstock light hydrocarbon is greater than about 80%. In some embodiments, the conversion, based upon the feedstock light hydrocarbon is greater than about 85%. In some embodiments, the conversion, based upon the feedstock light hydrocarbon is greater than about 88%. In some embodiments, the conversion, based upon the feedstock light hydrocarbon is greater than about 90%. In some embodiments, the conversion, based upon the feedstock light hydrocarbon is greater than about 92%. In some embodiments, the conversion, based upon the feedstock light hydrocarbon is greater than about 95%. In some embodiments, the conversion, based upon the feedstock light hydrocarbon is greater than about 98%. In some embodiments, the conversion, or yield, based upon the feedstock light hydrocarbon is from about 80% to about 99.5%, from about 80% to about 98%, from about 80% to about 95%, from about 85% to about 99.5%, from about 85% to about 98%, or from about 85% to about 95%. In some embodiments, the conversion, or yield, based upon the feedstock light hydrocarbon is from about 80% to about 90%.

Referring now to FIG. 1, a general schematic diagram of a hydrocarbon gas conversion system 100 is shown. The system 100, includes a reaction chamber 110 in which a non-thermal gliding discharge 111 is generated and maintained. The system 100, also includes a high-voltage power source 130, a liquid sorbent pump 140, a hydrocarbon gas source 120, and a receiver 150. As illustrated the reaction chamber 110 is in communication with the hydrocarbon gas source 120, the receiver 150, and a vent 160.

Figure 2:
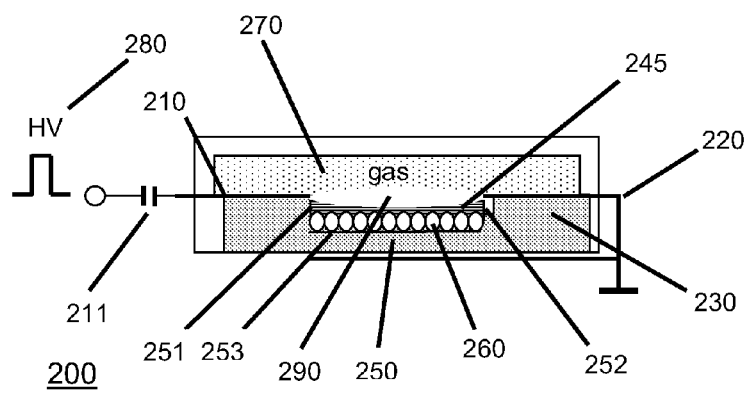
FIG. 2 is a schematic, cross-sectional, view of the electrodes and discharge plasma, in the plasma chamber of a reactor, according to one embodiment.
Figure 3:
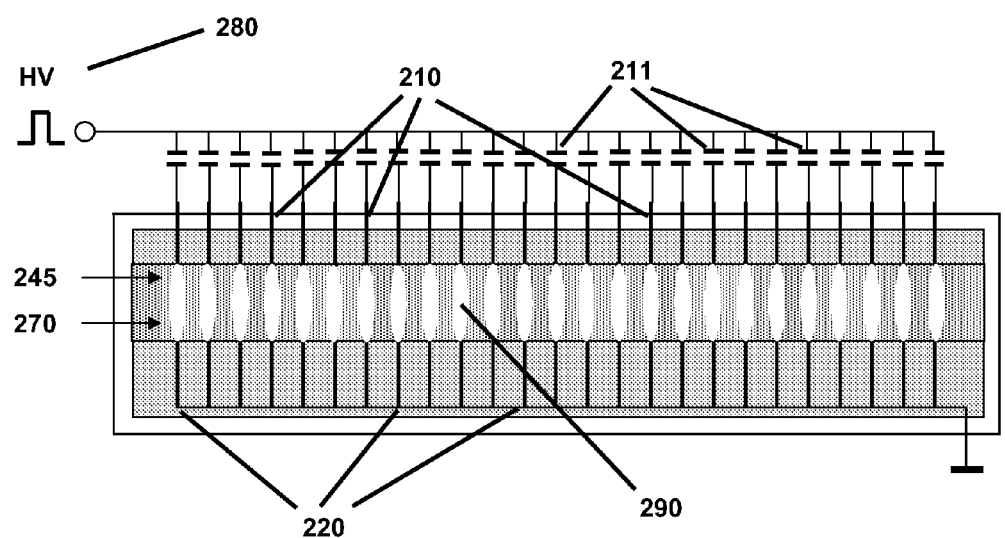
FIG. 3 is a schematic, cross-sectional, view of the electrodes and discharge plasma, orthogonally related to FIG. 2, and according to one embodiment.

As illustrated in FIGS. 2 and 3, a reaction chamber 200 includes a plurality of first electrodes 210 which are connected through capacitors 211 to a high-voltage source 280. The reaction chamber 200 also includes a plurality of second electrodes 220 that are grounded. The first electrodes 210 and the second electrodes 220 are aligned such that each first electrode 210 has a paired second electrode 220, and are spaced from one another by a gap, or discharge region 290. As shown in FIG. 3, the plurality of first electrodes 210 and the plurality of second electrodes 220 may be arranged in rows in a substantially horizontal plane in a linear fashion. FIGS. 2 and 3 are related in that FIG. 3 is a top view of a linearly arranged series of electrodes, while FIG. 2 is a side view of a single electrode pairing. In another embodiment, the plurality of first electrodes and the plurality of second electrodes may be arranged in substantially horizontal plane in an annular arrangement such that the first electrodes are located in a circular arrangement and the second electrodes are located in a concentric circular arrangement, and each of the first electrodes has a paired second electrode, as illustrated in FIG. 4, below.

The gap, or discharge region, 290, is where the non-thermal gliding discharge is initiated and maintained. As illustrated in FIG. 2, the discharge region 290 is located immediately above a trough 250 that is formed into a body 230 of the reaction chamber 200, the trough 250 having a first wall 251, a second wall 252, and a basin 253. The first and second electrodes 210, 220 are also located in close proximity to the trough 250, with the first electrode(s) 210 located near a top edge of the first wall 251 and the second electrode(s) 220 located near a top edge of the second wall 252.

The body 230 of the reaction chamber 200 is a substrate that provides for mounting of the first and second electrodes 210, 220 and in which the trough 250 is formed. Suitable materials for the body 230 include insulators known in the art, such as, but not limited to, plastic materials, such as polyethylene, polyethylene terephthalate, polypropylene, nylon, polytetrafluoroethylene (Teflon), styrene, and blends or copolymers thereof; glass; or ceramics. In some embodiments, the body 230 is made from Teflon.

Figure 4:
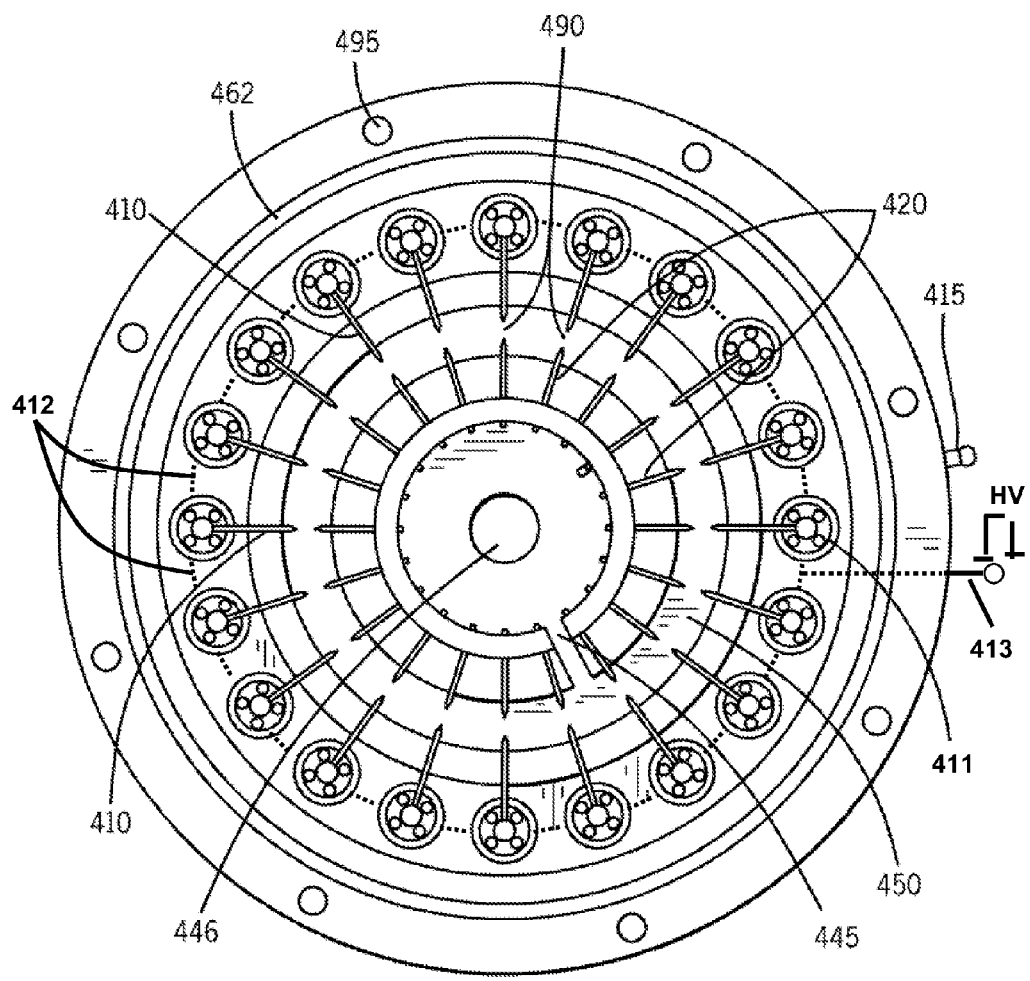
FIG. 4 is a drawing of an uncovered reaction chamber having an annular arrangement of electrodes, according to one embodiment.

As shown in FIG. 4, one non-limiting example of an annular arrangement includes the plurality of first electrodes 410, second electrodes 420, and trough 450. The first electrodes 410 and the second electrodes 420 are separated by the discharge gap 490. Each of the first electrodes 410 is connected through capacitor 411 to a circular conductor 412 provided by high-voltage connection port 413. Also included are a liquid sorbent inlet 415, a gas inlet (not shown), a gasket region 462 for securing a cover to isolate the reaction chamber and discharges, and bores 495 for receiving screws or other fastening devices to secure a cover on the reaction chamber. The trough 450 may be connected to a central receiving area 446 by one or more radial channels 445. As used herein, the phrase "radial channels" is used to refer to any channel that is provided connecting a trough to a collection receiver that is either located centrally or on the periphery of the reaction chamber, and is not limited to an annular arrangement, but may be related to any annular, polygonal, or linear arrangement of electrodes and troughs. The trough 450 and the one or more radial channels 445 are configured such that as hydrocarbons are produced in the discharge and collected in the trough 450, and as the volume of the sorbent and produced hydrocarbon in the trough 450 concomitantly increases, the sorbent and hydrocarbon produced is conveyed to a collection region such as the central receiving area 446. Central receiving area 446 may further be fluidically connected to a container for collecting the produced hydrocarbons and sorbent from the trough. The trough 450 and one or more radial channel(s) 445 are also configured to maintain the level of sorbent, and any produced hydrocarbon, in close proximity to the gliding discharge. Thus, the one or more radial channel(s) 445 do not allow for the sorbent, and any produced hydrocarbon to completely drain from the trough 450, but rather only drain liquid as the volume of liquid in the trough 450 increases.

The electrodes are made of conductors for the efficient conductance of voltage through the electrode. The electrodes may be prepared from materials such as, but not limited to, iron, chromium, nickel, gold, silver, copper, platinum, palladium, rhenium, ruthenium, molybdenum, tungsten, titanium, vanadium, alloys thereof, oxides thereof, graphite, or the like. iron, chromium, nickel, gold, silver, copper, platinum, yttrium, iridium, palladium, rhenium, ruthenium, molybdenum, tungsten, titanium, vanadium, alloys thereof, oxides thereof, graphite, or the like. According to some embodiments, the electrodes are graphite-coated. Thus, in some embodiments, a metal-based electrode is graphite-coated.

Figure 5:
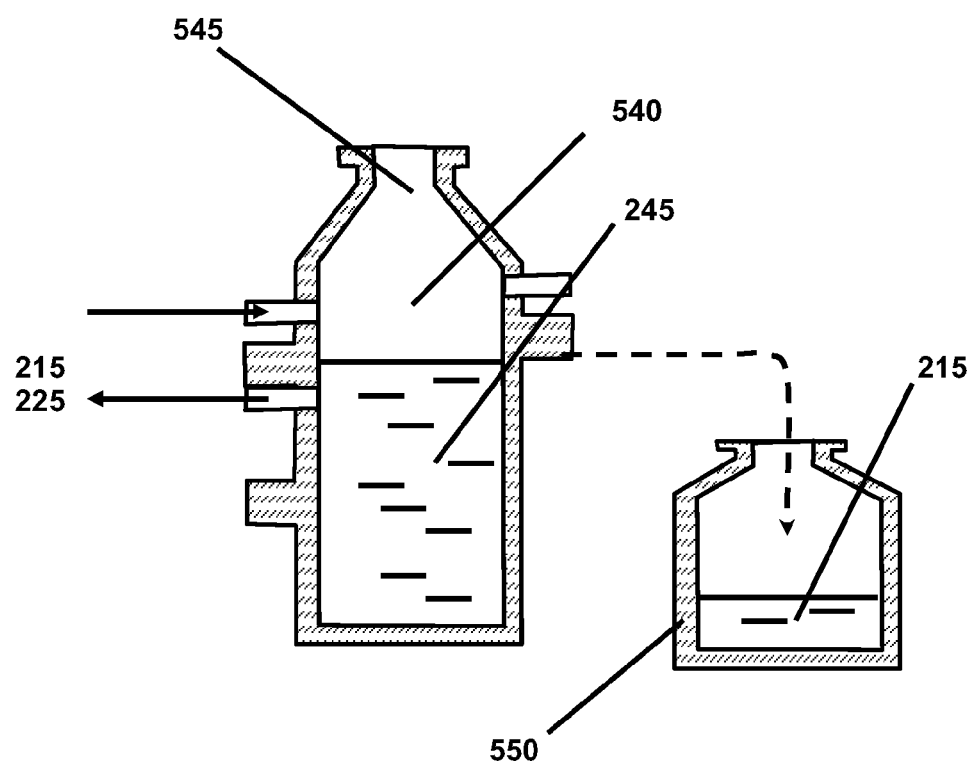
FIG. 5 is a schematic diagram of the reservoir and liquid flows, according to various embodiments.

FIG. 5 is an illustration of the liquid sorbent system where the level of the liquid sorbent is maintained in a reservoir that feeds the liquid sorbent pump for circulation through the reaction chamber. As the liquid hydrocarbon products are formed and the volume of the liquid sorbent concomitantly increases, the increase in volume causes the recovery of the product in the receiver. Because the liquid sorbent is selected to be of the same, or similar chemical composition to the products, there is no need for separation of the product from liquid sorbent. As noted herein, the product distribution may be adjusted based upon the high-voltage power supplied to the electrodes and the selection of the gaseous hydrocarbons used.

As shown in FIG. 5, port 545 allows for the reservoir 540 to be initially charged with sorbent 245. The reservoir 540 serves to hold an amount of sorbent 245, and is for initial collection of the product liquid hydrocarbons 215. As the liquid hydrocarbon products are generated and absorbed into the liquid sorbent 245 in the reaction chamber, the volume of the liquid sorbent 245 increases. As the volume of the liquid sorbent 245 increases, the products flow to the receiver 550 and are collected as a liquid product 215. To maintain the flow of the liquid sorbent 245, the material is drawn (illustrated as reference number 225) from the reservoir 540 to circulate by a liquid sorbent pump (not shown) through the reaction chamber. The reservoir system shown in FIG. 5, is illustrative of only one such arrangement.

Figure 6:
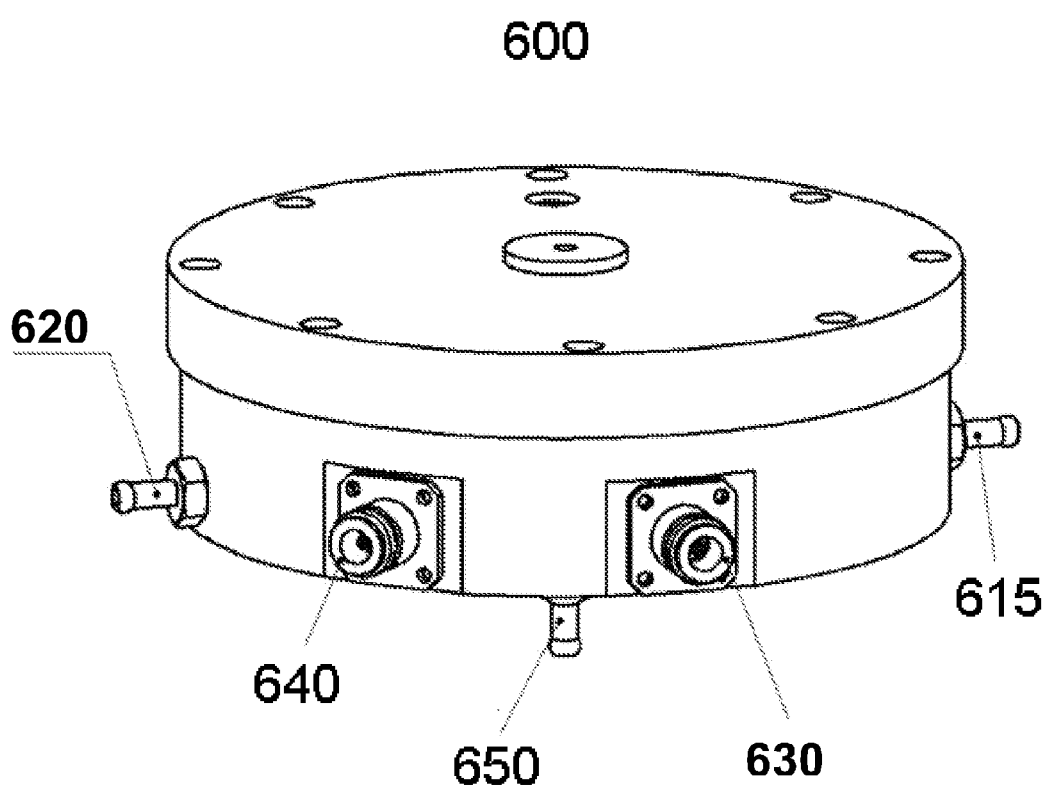
FIG. 6 is a perspective illustration of the exterior of a gas discharge reactor, according to various embodiments.

FIG. 6 illustrates that the reaction chamber 600 may include a first inlet 615 for liquid sorbent, a second inlet 620 for the hydrocarbon gas, a connection port 630 for a cable from the high-voltage pulse generator, a grounded connector 640, and a product outlet 650.

As described above, the electrodes are arranged in a substantially horizontal plane. This is to facilitate the containment and flow of the liquid sorbent in close proximity to the non-thermal plasma. The substantially horizontal arrangement also allows for a uniform distribution of the liquid sorbent with the non-thermal plasma. As used herein with respect to the distance of the plasma to the liquid sorbent, "close proximity" is a distance in which the liquid sorbent does not enter the plasma, although the plasma may touch the surface of the liquid sorbent, and in which liquid products from in the plasma may readily be absorbed by the liquid sorbent. In some embodiments, a close proximity refers to a distance that is less than about 0.5 mm.

Adjustment of the initial hydrocarbon gas composition may impact the types of liquid hydrocarbons that are produced. For example, selection of one non-oxygenated hydrocarbon feed gases may result in a given distribution of products, while selection of another non-oxygenated hydrocarbon feed gas, or mixtures of such hydrocarbons may result in a vastly different distribution of products. Liquid hydrocarbon products from non-oxygenated hydrocarbon feed gases may include, but are not limited to, branched or unbranched $C_5$-$C_{20}$ saturated hydrocarbons, branched or unbranched $C_5$-$C_{20}$ unsaturated hydrocarbons, or a mixture of any two or more such materials.

Referring again to FIGS. 1, 2, and 3, optionally, the trough 250 may contain a catalyst 260 that is active with respect to re-forming hydrocarbon fragments from the hydrocarbon, hydrogen, and oxygen radicals that each may be formed within the non-thermal plasma. However, it is noted that the presence of a catalyst in the trough is optional. As such, in some embodiments, the reaction chamber does not contain a catalyst. In other embodiments, the trough does not contain a catalyst.

As noted, the catalyst 260 in the trough 250 of the reaction chamber 200 is optional. However, in embodiments where the reaction chamber includes a catalyst, the catalyst may be located within the trough to facilitate liquid hydrocarbon formation. Suitable catalyst compositions for saturated hydrocarbon production include, but are not limited to, zeolites, alumina, alumosilica, alumophosphates, elements of Groups IA (Li, Na, and K), IIA (Be, Mg, Ca, Sr, and Ba), IB (Cu, Ag, and Au), IIB (Zn, Cd, and Hg) or VIIIB (Fe, Ru, Os, Co, Rh, Ir, Ni, Pd, or Pt), or a mixture of any two or more such catalysts. Suitable catalyst compositions for olefin production, include, but are not limited to, zeolites, an oxide of an element of Groups IIB (Zn, Cd, and Hg), IVB (C, Si, Ge, Sn, and Pb), VB (N, P, As, Sb, and Bi), or VIB (Cr, Mo, W), elements of Group VIIIB (Fe, Ru, Os, Co, Rh, Ir, Ni, Pd, and Pt), or a mixture of any two or more such catalysts. Suitable catalysts for hydrocarbon oil production include, but are not limited to, cations, metal oxides, and complexes of the elements of Groups IIA, IIIA, IVB, VB, or VIIIB, or a mixture of any two or more such catalysts. Suitable catalysts for oxygenated hydrocarbon production include, but are not limited to, elements of Groups IIA, IVA, IIB, IVB, or VIIB, or a mixture of any two or more such catalysts.

The devices described herein are amenable to being modular, scalable, and portable, thus making transport and use at otherwise hard to reach areas, such as off-shore drilling rigs and environmentally sensitive areas, a facile process. The devices are capable of converting natural gas into a stable fuel such as diesel, gasoline (benzin), light synthetic oil, kerosene and other hydrocarbon fuels that can be transported over the road, sea or rail in ordinary fuel transport vehicles.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

As used herein, "plurality" refers to two or more of the items used in conjunction with the term. For example, a plurality of electrodes may refer to two or more electrodes, or as many electrodes as necessary for the construction of a device containing the electrodes, and limited only by the physical dimensions of the device and its components.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

The devices and methods thus generally described above, will be understood by reference to the following examples, which are not intended to be limiting of the device or methods described above in any manner.

EXAMPLES

Operation of the devices described herein includes introducing a gas mixture that includes light hydrocarbons in to the gaseous hydrocarbon inlet, and directing the gas mixture through the gas discharge chamber which includes a non-thermal, repetitively pulsed gliding discharge. When the light hydrocarbons ($C_1$-$C_4$) contact the non-thermal, repetitively pulsed gliding discharge, the radicals that form re-arrange to re-form saturated liquid $C_5$-$C_{20}$ hydrocarbons, and hydrogen gas. Both of these materials then exit the reactor for collection. The conversion of the hydrocarbons inside the gas discharge chamber may reach 90%, and may be adjusted by varying the output power of the repetitively pulsed high voltage (HV) generator. At the reactor outlet, liquid products are collected. Waste gases ($H_2$ and residual $C_3$-$C_4$) are exhausted via a gas tube into a vent. Alternatively, residual hydrocarbon gases may be recycled into the system. Additionally, exhaust hydrogen, $H_2$, may be collected and used in other reactions or for other uses, or may be exhausted to the environment.

Repetitively pulsed high voltage generator. The repetitively pulsed high voltage generator is a semiconductor generator that is designed for ignition, maintenance, and feeding of the gas discharge inside reactor. The repetitively pulsed high voltage generator is the main source of energy required for implementation of the hydrocarbon gas conversion process. The high voltage generator includes thyristors as active elements for HV pulse formation, and works in a repetitively pulsed mode. A number of operating parameters of HV generator are presented in the Table 2.

TABLE 2

| Illustrative operating parameters of a repetitively pulsed HV generator | |
|---|---|
| Operating voltage | 10-15 kV |
| Peak current | up to 20 A |
| Maximum peak power | 200 kW |
| Pulse polarity | positive |
| Voltage pulse duration at half-maximum | 35 ± 2 μs |
| Pulse form | Triangular |
| Repetition rate | 1 kHz |
| Ambient temperature | from +10 to +30° C. (laboratory conditions) |
| Input voltage | Single-phase line, 110 V/60 Hz |
| Cooling | Air |
| Dimensions h × d × l m$^3$ | 0.15 × 0.3 × 0.4 m$^3$ |
| Weight (with transformer oil in a high voltage unit) | about 27 kg |

Plasma chemical reactor. The reactor includes a gas discharge chamber and provides conditions for an efficient radical formation and liquid species formation. It provides energy delivery to the gas discharge, implementation of initial gas conversion into liquids and a quick removal of them from the discharge area. An outside view of a reactor is shown in the FIG. 2.

TABLE 3

| Illustrative Reactor Information. | |
|---|---|
| Input voltage | from Generator |
| Electric power | up to 25 W |
| Ambient temperature | from +10 to +30° C. (laboratory conditions) |

TABLE 3-continued

Illustrative Reactor Information.

| | |
|---|---|
| Gas flow rate | more, than $6.3 \times 10^{-6}$ m$^3$/s |
| Liquid flow rate | $(1-2) \times 10^{-8}$ m$^3$/s |
| Working capacity | $10^{-5}$ kg/s |
| Dimensions | diameter - 0.2 m, height - 0.05 m |
| Weight | about 3 kg |

Example 1

Liquid sorbent was first added to the liquid sorbent reservoir and the level is adjusted to be just below the receiver tube inlet. The process is conducted at the ambient gas temperature and atmospheric gas pressure. A propane-butane feedgas mixture at a molar ratio of 1:3, was then introduced to the reaction chamber at a flow rate of approximately 23 L/min. Normal octane was used as the liquid sorbent. The specific energy deposited into the gas per one pulse was 1 J/cm$^3$, the repetition rate of high voltage pulses was set at 1000 Hz, and the discharge gap between electrodes was 1.5 cm. The reaction was operated for one hour. During this time, 96.5 mL of liquid condensate was collected. The liquid condensate was predominantly a mixture of alkanes (yield: 87 mol %).

In the experiments conducted, safety precautions were observed, including using care when making all electrical connections and ensuring proper ventilation. Also, the pulsed power source was properly grounded; exhaust gases were ventilated, treated, or captured; the supports and surfaces were electrically insulating, or at least well grounded; and prior to generator initiation, the gas flow was run for a time sufficient to remove residual air inside the reactor.

Equivalents

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A process of converting gaseous hydrocarbons to a liquid hydrocarbon composition, the process comprising:
   introducing a gaseous hydrocarbon into a reactor comprising:
      a plurality of first electrodes, each individually connected to a pulsed, high-voltage power source;
      a plurality of second electrodes that are grounded; and
      a trough;
      the plurality of first electrodes being separated from the plurality of second electrodes by a discharge region;
   introducing to the trough a liquid sorbent comprising gasoline, diesel fuel, kerosene, a liquid alkane, or a mixture of any two or more such materials;
   generating a non-thermal, repetitively pulsed gliding discharge in the discharge region; and
   producing the liquid hydrocarbon composition.

2. The process of claim 1, wherein a level of the liquid sorbent in the reactor is maintained in close proximity to the discharge region.

3. The process of claim 1, wherein a duration of a single pulse of the non-thermal, repetitively-pulsed gas discharge reactor is less than 100 ns.

4. The process of claim 1, wherein an electric field strength inside the non-thermal, repetitively-pulsed gas discharge reactor is less than 8 kV/cm.

5. The process of claim 1, wherein the gaseous hydrocarbon is a $C_1$, $C_2$, $C_3$, or $C_4$ alkane.

6. The process of claim 5, wherein the gaseous hydrocarbon is methane, ethane, n-propane, iso-propane, n-butane, iso-butane, tent-butane, or a mixture of any two or more thereof.

7. The process of claim 1, wherein the gaseous hydrocarbon further comprises $CO_2$.

8. The process of claim 1, wherein the reactor further comprises a solid catalyst.

9. The process of claim 8, wherein the solid catalyst comprises alumina, alumosilica, an aluminophosphate, Li, Na, K, Be, Mg, Ca, Sr, Ba, Cu, Ag, Au, Zn, Cd, Hg, Fe, Ru, Os, Co, Rh, Ir, Ni, Pd, Pt, or a mixture of any two or more thereof.

10. The process of claim 2, wherein a time of a single discharge is on the order of about 10 ns.

11. The process of claim 1, wherein the liquid hydrocarbon composition comprises olefins and the specific energy of the non-thermal, repetitively-pulsed gas discharge is about 2 J/cm$^3$ per pulse.

12. The process of claim 1, wherein the liquid hydrocarbon composition comprises hydrocarbon oils, and the specific energy of gas discharge is from about 2 J/cm$^3$ to about 2.5 J/cm$^3$ per one discharge pulse.

13. The process of claim 1, wherein the reactor comprises a solid catalyst comprising oxides of elements IIA, IVA, IIB, IVB groups and elements of VIIIB group.

14. A process of converting gaseous hydrocarbons to liquid hydrocarbon fuel, the process comprising:
  introducing a gaseous hydrocarbon into a reactor comprising:
    a plurality of first electrodes, each individually connected to a pulsed, high-voltage power source;
    a plurality of second electrodes that are grounded; and
    a trough;
    the plurality of first electrodes being separated from the plurality of second electrodes by a discharge region;
  introducing to the trough a liquid sorbent;
  generating a non-thermal, repetitively pulsed gliding discharge in the discharge region; and
  producing a liquid hydrocarbon composition;
  wherein a duration of a single pulse of the non-thermal, repetitively-pulsed gas discharge reactor is less than 100 ns.

15. The process of claim 14, wherein a level of the liquid sorbent in the reactor is maintained in close proximity to the discharge region.

16. The process of claim 14, wherein an electric field strength inside the non-thermal, repetitively-pulsed gas discharge reactor is less than 8 kV/cm.

17. The process of claim 14, wherein the gaseous hydrocarbon is a $C_1$, $C_2$, $C_3$, or $C_4$ alkane.

18. The process of claim 17, wherein the gaseous hydrocarbon is methane, ethane, n-propane, iso-propane, n-butane, iso-butane, tent-butane, or a mixture of any two or more Thereof.

19. The process of claim 14, wherein the gaseous hydrocarbon further comprises $CO_2$, air, or oxygen.

20. The process of claim 14, wherein the reactor further comprises a solid catalyst.

21. The process of claim 20, wherein the solid catalyst comprises alumina, alumosilica, an aluminophosphate, Li, Na, K, Be, Mg, Ca, Sr, Ba, Cu, Ag, Au, Zn, Cd, Hg, Fe, Ru, Os, Co, Rh, Ir, Ni, Pd, Pt, or a mixture of any two or more thereof.

22. The process of claim 14, wherein the liquid sorbent is gasoline, diesel fuel, kerosene, a liquid alkane, or a mixture of any two or more such materials.

23. The process of claim 14, wherein a time of a single discharge is on the order of about 10 ns.

24. The process of claim 14, wherein the liquid hydrocarbon composition comprises olefins and the specific energy of the non-thermal, repetitively-pulsed gas discharge is about 2 $J/cm^3$ per pulse.

25. The process of claim 14, wherein the liquid hydrocarbon composition comprises hydrocarbon oils, and the specific energy of gas discharge is from about 2 $J/cm^3$ to about 2.5 $J/cm^3$ per one discharge pulse.

26. The process of claim 14, wherein the reactor comprises a solid catalyst comprising oxides of elements IIA, IVA, IIB, IVB groups and elements of VIIIB group.

* * * * *

UNITED STATES PATENT AND TRADEMARK OFFICE
CERTIFICATE OF CORRECTION

| | | |
|---|---|---|
| PATENT NO. | : 8,784,617 B2 | Page 1 of 1 |
| APPLICATION NO. | : 13/015321 | |
| DATED | : July 22, 2014 | |
| INVENTOR(S) | : Novoselov et al. | |

It is certified that error appears in the above-identified patent and that said Letters Patent is hereby corrected as shown below:

In the Claims

In Column 16, Claim 6, Line 45, remove the word "tent-butane" and replace it with --tert-butane--.

In Column 16, Claim 7, Line 48, add the following language after the last word appearing in the sentence "air or oxygen.".

In Column 17, Claim 18, Line 28, remove the word "tent-butane" and replace it with --tert-butane--.

In Column 17, Claim 18, Line 29, remove the word "Thereof." and replace it with --thereof.--.

Signed and Sealed this
Seventh Day of October, 2014

Michelle K. Lee
*Deputy Director of the United States Patent and Trademark Office*